(12) United States Patent
Nawy et al.

(10) Patent No.: US 9,369,305 B1
(45) Date of Patent: Jun. 14, 2016

(54) SHORT MESSAGE SERVICE (SMS)-ENABLED OPEN AUTOMATED DEMAND RESPONSE (OPENADR) SERVER AND RELATED COMMUNICATIONS SYSTEMS AND METHODS

(71) Applicant: IPKeys Technologies LLC, Eatontown, NJ (US)

(72) Inventors: Robert Nawy, Lincroft, NJ (US); Daniel W. Havens, San Diego, CA (US); Jim Boch, Stafford, VA (US); William Walker, Red Bank, NJ (US); Robert Womack, Acworth, GA (US)

(73) Assignee: IPKEYS TECHNOLOGIES LLC, Eatontown, NJ (US)

( * ) Notice: Subject to any disclaimer, the term of this patent is extended or adjusted under 35 U.S.C. 154(b) by 548 days.

(21) Appl. No.: 13/739,418

(22) Filed: Jan. 11, 2013

Related U.S. Application Data

(60) Provisional application No. 61/620,536, filed on Apr. 5, 2012.

(51) Int. Cl.
 *H04L 12/58* (2006.01)
 *G06F 1/32* (2006.01)
 *G05B 13/02* (2006.01)

(52) U.S. Cl.
 CPC ............. *H04L 12/58* (2013.01); *G05B 13/02* (2013.01); *G05B 2219/2642* (2013.01); *G06F 1/3206* (2013.01)

(58) Field of Classification Search
 CPC ............ G05B 13/02; G05B 2219/2642; G06F 1/3206; G06F 9/5094; H04L 12/58
 USPC .......................................................... 709/206
 See application file for complete search history.

(56) References Cited

U.S. PATENT DOCUMENTS

| | | | |
|---|---|---|---|
| 7,901,394 B2 | 3/2011 | Ireland et al. | |
| 8,126,735 B2 | 2/2012 | Dicks et al. | |
| 2005/0188853 A1 | 9/2005 | Scannell | |
| 2006/0036134 A1 | 2/2006 | Tarassenko et al. | |
| 2006/0075276 A1* | 4/2006 | Kataria et al. | 714/4 |
| 2006/0089542 A1 | 4/2006 | Sands | |
| 2007/0055640 A1* | 3/2007 | Dababneh et al. | 705/412 |
| 2007/0287484 A1* | 12/2007 | Chava et al. | 455/466 |
| 2008/0102862 A1* | 5/2008 | Veeraraghavan | H04W 4/14 455/466 |
| 2008/0154099 A1 | 6/2008 | Aspel et al. | |
| 2008/0269673 A1 | 10/2008 | Butoi et al. | |

(Continued)

OTHER PUBLICATIONS

Lawrence Berkeley National Laboratory (Open Automated Demand Response Communications Specification (Version 1.0)) Lawrence Berkeley National Laboratory, Apr. 2009, Pier Final Project Report; 214 pgs.*

(Continued)

*Primary Examiner* — Oleg Survillo
*Assistant Examiner* — Christopher Cadorna
(74) *Attorney, Agent, or Firm* — Lowenstein Sandler LLP

(57) ABSTRACT

A system and method for short message service (SMS)-enabled Open Automated Demand Response (OADR) server and related communications is presented. The method includes receiving, by a processing device integrated with a first endpoint device, a first SMS message that represents a first OADR-conformant message, processing the first SMS message, and causing an energy consuming device to execute an action based on the first SMS message.

24 Claims, 6 Drawing Sheets

(56) References Cited

U.S. PATENT DOCUMENTS

| | | |
|---|---|---|
| 2009/0099864 A1 | 4/2009 | Cronrath et al. |
| 2010/0228111 A1 | 9/2010 | Friman et al. |
| 2010/0240979 A1 | 9/2010 | Atkin |
| 2010/0279418 A1 | 11/2010 | Larson et al. |
| 2010/0331654 A1 | 12/2010 | Jerdonek et al. |
| 2011/0111736 A1 | 5/2011 | Dalton et al. |
| 2011/0125530 A1 | 5/2011 | Drucker et al. |
| 2011/0207438 A1* | 8/2011 | Sanjeev .......... H04M 1/274575 455/414.1 |
| 2012/0323393 A1* | 12/2012 | Imhof et al. .................. 700/297 |

OTHER PUBLICATIONS

Triventi, M. et al., "SMS-Based Platform for Cardiovascular Tele-Monitoring," Computers in Cardiology, vol. 35, pp. 1009-1012 (2008).

Schwarz, Peter, "Telemedicine and Diabetes Management," Department for Prevention and Care, University Hospital, Health Conference (2010).

Krishna, Santosh et al., "Diabetes Self-Management Care via Cell Phone: A Systematic Review," Journal of Diabetes Science and Technology, vol. 2, Issue 3, pp. 509-517 (May 2008).

* cited by examiner

SHORT MESSAGE SERVICE (SMS)-ENABLED OPEN AUTOMATED DEMAND RESPONSE (OPENADR) SERVER AND RELATED COMMUNICATIONS SYSTEMS AND METHODS

CROSS-REFERENCE TO RELATED APPLICATIONS

The present application claims the benefit, pursuant to the provisions of 35 U.S.C. 119, of U.S. Provisional Application Ser. No. 61/620,536, titled "SMS-Enabled OpenADR 2.0 Proxy Server and Related Communications Systems and Methods", filed on Apr. 5, 2012, which is herein incorporated by reference.

FIELD OF THE INVENTION

The present invention relates generally to a system and a method involving Open Automated Demand Response (OpenADR) communications, more particularly to a system and method for a short message service (SMS) enabled OpenADR Server and related communications.

BACKGROUND OF THE INVENTION

Demand Response (DR) is an established methodology for managing peak electrical demand by providing incentives to customers to reduce load on demand. An example of DR is a set of actions taken to reduce load when electric grid contingencies threaten supply-demand balance or market conditions occur that raise electricity costs.

DR plays a vital role in energy grid stabilization (for example during hot summers), easing severely constrained electrical grids. Future energy crises caused by electricity demand exceeding system capacity may be postponed or even averted through DR. Automated Demand Response (ADR) is a systematic technology and communications platform that helps system operators reduce the operating costs of DR programs while improving DR resource reliability and consistency.

Open Automated Demand Response (OADR) is an open and standardized methodology for energy providers and system operators to communicate and convey energy market signals and DR signals with each other, and with their customers, using a common language. A typical use of OADR includes transmitting information and signals that cause electrical power-using devices to be turned off during periods of high demand. OADR information may be transmitted from electricity providers and system operators to the customers via Transmission Control Protocol (TCP) and Internet Protocol (IP), commonly known as TCP/IP. TCP/IP is a set of communications protocols used for the Internet and similar networks. OADR information may be transmitted and received over an existing IP-based communications network, such as the Internet. OADR version 2.0 (OADR 2.0) is a standard version of OADR that enables scaled deployments and interoperability within Smart Grid technologies, thus reducing the cost of DR technology enablement and customer adoption.

OADR 2.0 implements an open protocol that is compliant with the standards as set forth by the Organization for the Advancement of Structured Information Standards (OASIS). OASIS is a global consortium that drives the development, convergence, and adoption of e-business and web service standards. The recently completed OASIS Energy Interoperation standard was created to provide a single format for energy market communications, based on the Extensible Markup Language (XML) system and protocol. These XML-based communications typically require an Internet connection to provide the link between energy providers and consumers. However, the required Internet connections are often difficult to implement and expensive to operate. Furthermore, certain businesses may not want their data to be transmitted over the internet, and may not want their internal networks connected to the outside world.

BRIEF DESCRIPTION OF THE DRAWINGS

The present invention will be more readily understood from the detailed description of embodiments presented below considered in conjunction with the attached drawings, of which.

It is to be understood that the attached drawings are for purposes of illustrating the concepts of the invention.

DETAILED DESCRIPTION OF THE INVENTION

Embodiments of the present invention are directed to a system and method for short message service (SMS) enabled Open Automated Demand Response (OADR) server and related communications.

In an embodiment, the system may comprise an endpoint configured to receive, by a processing device integrated with an endpoint device, a short message service (SMS) message that represents an Open Automatic Demand Response (OADR)-conformant message. The endpoint may then process the received SMS message, and cause an energy consuming system that is communicably coupled to the endpoint to execute an action based on the SMS message. The action may reduce or discontinue energy use based on an explicit request or on an energy market signal or begin supplying energy using client side energy generating equipment. In another embodiment, the system may comprise a central data center configured to transmit the SMS message that represents the OADR-conformant message to an endpoint device.

Figure 1:
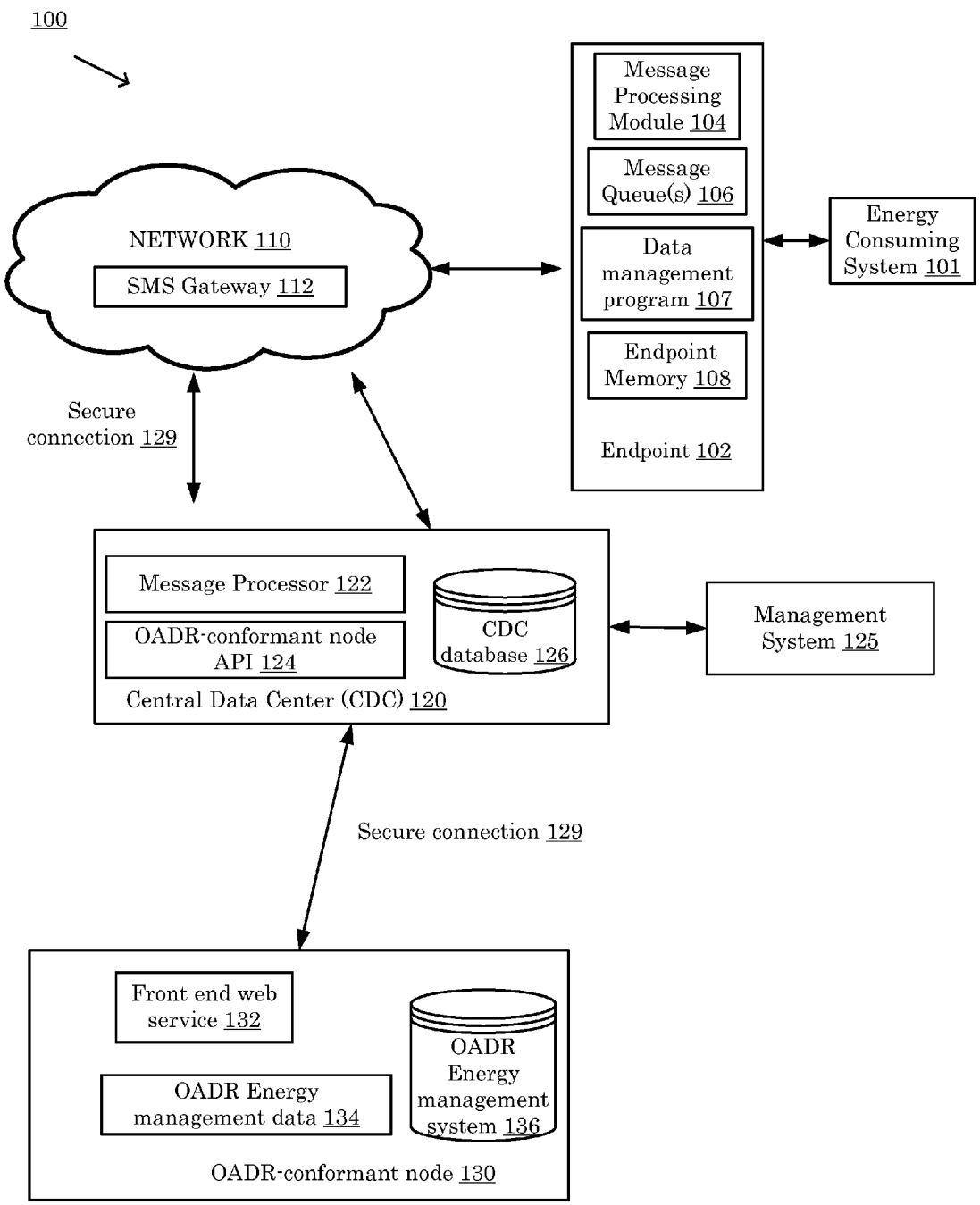
FIG. 1 is a block diagram of a system for short message service (SMS)-enabled Open Automated Demand Response (OpenADR) server and related communications in accordance with embodiments of the present invention.

FIG. 1 illustrates a block diagram of a networked environment 100 including an endpoint 102, according to embodiments of the present invention. In one embodiment, the endpoint 102 is a device for managing and controlling an energy consuming system 101. The energy consuming system 101 may be any system or device that consumes energy, for example, a heating, ventilation, and air conditioning (HVAC) system. The endpoint 102 may be directly integrated with the energy consuming system 101 or may be separate from, but communicatively coupled to, the energy consuming system

101. The endpoint 102 may include inputs (e.g., digital and analog inputs and outputs or dry contacts) that measure or receive a variable (e.g., temperature, humidity, or pressure) and may include outputs to control the energy consuming system.

In an embodiment, the endpoint 102 includes a message processing module 104. The message processing module may receive and process short message service (SMS) messages at the endpoint 102. SMS is a text messaging service component of phone, web, or mobile communication systems, using standardized communications protocols that allow the exchange of short text messages between fixed line or mobile phone devices. In an embodiment, the message processing module 104 may process and facilitate sending, receiving, playing, and displaying SMS messages that communicate OADR-based messages. As used herein, the term "processor" or a "processing device" is intended to include, but is not limited to, a programmable electronic machine that performs executes software to perform several operations such as assemble, store, correlate, or otherwise processes information.

Endpoint 102 may also include one or more message queues 106. The message queues 106 may be processed real time or in near real time. The message queue(s) 106 may include one or more queues used to store SMS messages received at the endpoint 102 and/or SMS messages to be sent from the endpoint 102. In some embodiments, the message queue(s) 106 may interact with endpoint memory 108 to provide storage of the SMS messages tracked by message queue(s) 106. The message queue(s) 106 may store SMS messages that have been received from an external source and are to be presented to a user of the endpoint 102. The message queue(s) 106 may also store SMS messages generated at the endpoint 102 that are to be sent to the external source.

In an embodiment, the endpoint 102 also includes a data management program 107. The data management program 107 may be a computer software program configured to translate an SMS message and control and execute changes to the operations of the energy consuming system 101 in accordance with instructions in the SMS message. The data management program 107 may maintain the energy usage data and other associated data used for managing and controlling the energy consuming system 101.

Networked environment 100 further includes a network 110, which may be a local area network (LAN) or a wide area network (WAN) and/or may be a combination of one or more networks (e.g., the Internet, or a wired or wireless telephone network). In one embodiment, network 100 includes any type of communications medium that allows for SMS messages to be communicated to and from endpoint 102. Network 100 may also include an SMS gateway 112. SMS gateway 112 is a telecommunications network facility for sending or receiving SMS transmissions to or from a telecommunications network that support SMS. The SMS gateway 112 may be a network node that is equipped and configured for interfacing with another network that may use a different communications protocol. In some embodiments, the SMS gateway 112 may be managed by a third-party provider, such as a mobile network operator.

In one embodiment, the endpoint 102 is configured to communicatively connect to the SMS gateway 112 via the network 110. The endpoint 102 may include, but is not limited to, any transmitter and/or receiver that is capable of communicating with the SMS gateway 112 via the network 110. In an embodiment, the endpoint 102 communicates with the network 110 via a wireless connection using network protocols such as, but not limited to, code division multiple access (CDMA) and global system for mobile (GSM).

Networked environment 100 may also include a Central Data Center (CDC) 120. In an embodiment, the CDC 120 may be a proxy server or any other computing device that runs one or more services associated with the endpoint 102. Examples of services include, but are not limited to, interfacing with the SMS gateway 112 to send and receive SMS messages associated with the endpoint 102, processing and transforming SMS messages associated with the endpoint 102, processing and digesting OADR messages for transmission to the endpoint 102 in an SMS format, providing access to endpoint 102 data, provisioning new endpoints 102, and providing administrative functions associated with the endpoint 102 to an OADR-conformant node 130 associated with the endpoint 102.

The CDC 120 is configured to communicatively connect to the endpoint 102 via SMS gateway 112 and network 110. The CDC 120 may include any transmitter and receiver components that are capable of communicating with the SMS gateway 112 via the network 110. In an embodiment, the CDC 120 may be configured to communicatively connect to the SMS gateway 112 via a secure connection 129. In an embodiment, the CDC 120 communicates with the network 110 via a wireless connection using network protocols and a communications protocol module such as, for example, a communications protocol module for code division multiple access (CDMA) and for global system for mobile (GSM).

In one embodiment, the CDC 120 is also communicably coupled to an OADR-conformant node 130. OADR-conformant node 130 may be a system (e.g., a computing device or set of computing devices) that provides energy management demand response (DR) services. For example, the OADR-conformant node may utilize DR signals to manage peak electrical demand at one or more locations having energy consuming systems, such as energy consuming system 101. In some embodiments, the CDC 120 is configured to communicatively connect to the OADR-conformant node 130 via a secure connection 129. The secure connection 129 may be, but is not limited to, an internet connections made secure by provision of firewall security to prevent hackers, snoopers or spam-mail senders, or via encryption of messages, typically used for a virtual private network (VPN).

As shown in FIG. 1, the CDC 120 includes, but is not limited to, a message processor 122, an OADR-conformant node API 124, and a CDC database 126. Further details related to services provided by the CDC 120 are discussed below with respect to FIGS. 2 through 5.

The message processor 122 of CDC 120 may process and facilitate transmitting and receiving SMS messages to and from the endpoint 102 via the SMS gateway 112 and the network 110. In some embodiments, message processor 122 receives OADR-conformant messages and digests these messages to prepare them for SMS transmission to the endpoint 102. Similarly, message processor 122 may receive SMS messages from the endpoint 102 and transform the received message into an OADR-conformant format for communication with an OADR-conformant node 130, for example. The message processor 122 may execute one or more computer software programs configured to perform the functions described in detail below.

The OADR-conformant node API 124 of CDC 120 may be an interface to the OADR-conformant node 130 and may be used to receive OADR-conformant messages from the OADR-conformant node 130 for processing and digestion into SMS messages to be distributed to endpoints 102. In some embodiments, the OADR-conformant node API 124 is used to provide confirmation and verification messages to the OADR-conformant node 130 upon delivery of SMS messages (associated with OADR-conformant messages) to an endpoint 102.

The CDC database 126 of CDC 120 may store SMS messages that are accessed and used by the message processor 122 and the OADR-conformant node API 124. As used herein, the term "database" is intended to include, but is not limited to, a repository for containing and storing data.

In one embodiment, the CDC 120 is communicatively connected to a management system 125. Management system 125 may be part of the CDC 120 or may be provided by a separate computing device, such as a server device, than the CDC 120. The management system 125 may monitor status of each of the SMS gateway 112, CDC database 126, message processor 122, OADR-conformant node API 124, and/or any hardware used to implement the networked environment 100.

In an embodiment, two different types of endpoints 102 may be configured to provide different services related to energy management of energy consuming system 101. A first type of endpoint 102 may receive and execute do/no do commands in relation to energy consuming system 101. A do/no do command is a command which is executed by the endpoint 102 without further decision-making steps. These commands may cause actions such as reduction or consumption, generating energy or preparatory actions such as pre-cooling.

A second type of endpoint 102 may receive, reconstitute, and act on OADR messages delivered via SMS. In addition, the second type of endpoint 102 may reformat an SMS message into an OADR-compliant message to be forwarded via an IP transport to another device, such as energy consuming system 101. Other types of endpoints may also be implemented and embodiments of the invention are not limited to the above-described examples of endpoint types.

In one embodiment, templates are used to create a framework for OADR elements to include in an SMS message that is to be sent to an endpoint, such as the second type of endpoint described above. Examples of OADR elements include, but are not limited to, a price of a unit of energy, a load amount indicating an amount of load to shed, and a number signifying the reliability of a grid. The templates may be available in a repository, e.g., CDC database 126 on the CDC 120 and duplicated in memory 108 of endpoint 102. In one embodiment, OADR elements may be denoted in an SMS message via the use of extensible markup language (XML) tags. For example, an XML tag may signify the opening and closing of an OADR element in an SMS message. Two types of tags may include an element's start tag and the element's end tag. Fixed or static variables may be used to set values for XML tags that do not change for a specific endpoint.

In further embodiments, a dictionary may be included in a repository, e.g., CDC database 126 of the CDC 120, and duplicated in memory 108 of endpoints 102 (e.g., such as the second type of endpoint 102 discussed above). The dictionary may include abbreviated field names of the SMS messages that enable the translation of OADR-conformant messages to SMS messages, and vice versa. Such field names are addressed in further detail below in the discussions relating to SMS message formats.

In an embodiment, either the CDC 120 or the endpoint 102 or both may hold the state of the last SMS message transmitted between the CDC 120 and the endpoint 102. State information may include indicators such as whether the message was transmitted, whether it was successfully received, and if any errors were involved in the transmission of the message. Communications of OADR-conformant messages between the endpoint 102 (first and/or second type) and the CDC 120 are enabled by formatting the OADR-conformant messages into an SMS-compliant protocol. In some embodiments, the CDC may also prepare template and dictionary update messages appropriate to the endpoint based on a read-only memory (ROM) version contained in endpoint polling messages. These template and dictionary update messages allow the CDC 120 and endpoint 102 to remain synchronized in terms of digestion of OADR-conformant messages into an SMS format.

Following below are example SMS message formats that may be utilized in to communicate OADR-based messages between the endpoint 102 and the CDC 120. One skilled in the art will appreciate that the below examples are not intended to be limiting to embodiments of the invention, and that other message formats may be utilized to achieve various embodiments of the invention.

In an embodiment, an SMS message that may be transmitted from an endpoint 102 (e.g., an endpoint of the above-described first type) to the CDC 120 may be formatted as follows:
1. "0100" for a type 1 endpoint
2. "NNNNNNNNNN": endpoint phone number
3. "TTTTTTTT": Time stamp (number of milliseconds (ms) since 00:00:00 Hours 01/01/2000)
4. "C": Code ("C"—confirmation, "P"—poll, or "V"—verification.)
5. "NNNN": Endpoint ROM Version—"0000" for Type 1 endpoint
6. "NNNNNN": (meter reading in Kwh) (Only if field 4 is "V".)

In an embodiment, an example interaction pattern between the CDC 120 and an endpoint 102 follows:
1. 0100" for a type 1 endpoint
2. "NNNNNNNNNN": endpoint phone number
3. "TTTTTTTT": Time stamp (number of milliseconds (ms) since 00:00:00 Hours 01/01/2000)
4. "P": Code ("C"—confirmation, "P"—poll, or "V"—verification.)
5. "0000": Endpoint ROM Version—"0000" for Type 1 endpoint In an embodiment, the poll request from the endpoint described above might be answered by a CDC response:
1. "0100" for a type 1 endpoint
2. "NNNNNNNNNN": CDC phone number.
3. "TTTTTTTT": Time stamp (number of milliseconds (ms) since 00:00:00 Hours 01/01/2000).
4. "N": Current state message code (D—Do or N—No Do).
5. "D": New state message code (D—Do or N—No Do).

The response above indicates a new demand response event is active. In an embodiment, a confirmation by the endpoint that it received the event message would be the following:
1. 0100" for a type 1 endpoint
2. "NNNNNNNNNN": endpoint phone number
3. "TTTTTTTT": Time stamp (number of milliseconds (ms) since 00:00:00 Hours 01/01/2000)
4. "C": Code ("C"—confirmation, "P"—poll, or "V"—verification.)
5. "0000": Endpoint ROM Version—"0000" for Type 1 endpoint In another embodiment, the SMS message that may be transmitted from the CDC 120 to an endpoint (e.g., an endpoint of the above-described first type) may be formatted as follows:
1. "0100" for a type 1 endpoint
2. "NNNNNNNNNN": CDC phone number.

3. "TTTTTTTT": Time stamp (number of milliseconds (ms) since 00:00:00 Hours 01/01/2000).
  4. "C": Current state message code (D—Do or N—No Do).
  5. "C": New state message code (D—Do or N—No Do).

In another embodiment, the SMS message that may be transmitted from an endpoint (e.g., an endpoint of the above-described second type) to the CDC 120 may be formatted as follows:
  1. "0200" for an type 2 endpoint
  2. "NNNNNNNNNN": endpoint phone number
  3. "TTTTTTTT": Time stamp (number of milliseconds (ms) since 00:00:00 Hours 01/01/2000)
  4. "C": Code ("C"—confirmation, "P"—poll, or "V"—verification.)
  5. "NNNN": Endpoint ROM Version
  6. NNNNNN (meter reading in Kwh) (Only if field 4 is "V".)

In another embodiment, various SMS messages may be transmitted from the CDC 120 to an endpoint (e.g., an endpoint of the above-described second type). The various messages may be formatted as follows:

Start message:
  1. "0200" for a type 2 endpoint
  2. "NNNNNNNNNN": CDC phone number
  3. "TTTTTTTT": Time stamp (number of milliseconds (ms) since 00:00:00 Hours 01/01/2000)
  4. "I": Initial tag—is this an update to the existing message ("U") or a new message ("N")
  5. "TTTT": Template name—for a new message, the template is named
  6. "NNNN": Number of messages to follow Tag Message/Static Variable
  1. "0200" for a type 2 endpoint
  2. "NNNNNNNNNN": CDC phone number
  3. "TTTTTTTT": Time stamp (number of milliseconds (ms) since 00:00:00 Hours 01/01/2000)
  4. "X": Message Sub-type—Tag Message ("T"), Static Variable Message ("S")
  5. "XXXX": Digested Tag Name—a blank tag name indicates the value should be appended to the content of the Tag Value of the prior message
  6. "NN": Hierarchy number, may be null
  7. <Tag Value>: Variable length content Dictionary Update Message
  1. "0200" for a type 2 endpoint
  2. "NNNNNNNNNN": CDC phone number
  3. "TTTTTTTT": Time stamp (number of milliseconds (ms) since 00:00:00 Hours 01/01/2000)
  4. "X": Message Sub-type—"D" Dictionary Update Message
  5. "NNNN": Effective endpoint ROM Version after update (e.g., ROM version information may be used to determine appropriate update messages for the endpoint 102)
  6. "XXXX": Digested Tag Name—a blank tag name indicates the value should be appended to the content of the Tag Value of the prior message
  7. "NN": Hierarchy number, may be null
  8. "=": A dictionary update may modify or update the Digested Tag Name with a new definition, e.g. the Tag Value
  9. <Tag Value>: Variable length content, for a Dictionary Update Message, this value is the expanded name of the tag Template Update Message
  1. "0200" for a type 2 endpoint
  2. "NNNNNNNNNN": CDC phone number
  3. "TTTTTTTT": Time stamp (number of milliseconds (ms) since 00:00:00 Hours 01/01/2000)
  4. "X": Message Sub-type—"T" Dictionary Update Message
  5. "NNNN": Effective endpoint ROM Version after update
  6. "XXXX": Template Name—a blank tag name indicates the value should be appended to the content of the Tag Value of the prior message
  7. "NN": Hierarchy number, may be null
  8. "=": A dictionary update may modify or update the Digested Tag Name with a new definition, e.g. the Tag Value
  9. <Tag Value>: Variable length content—the template In embodiments of the disclosure, there is a one-to-many relationship between OADR-conformant messages received via the OADR-conformation API 124 from OADR-conformation node 130 and SMS messages from the CDC 120 to the endpoint 102.

Figure 2:
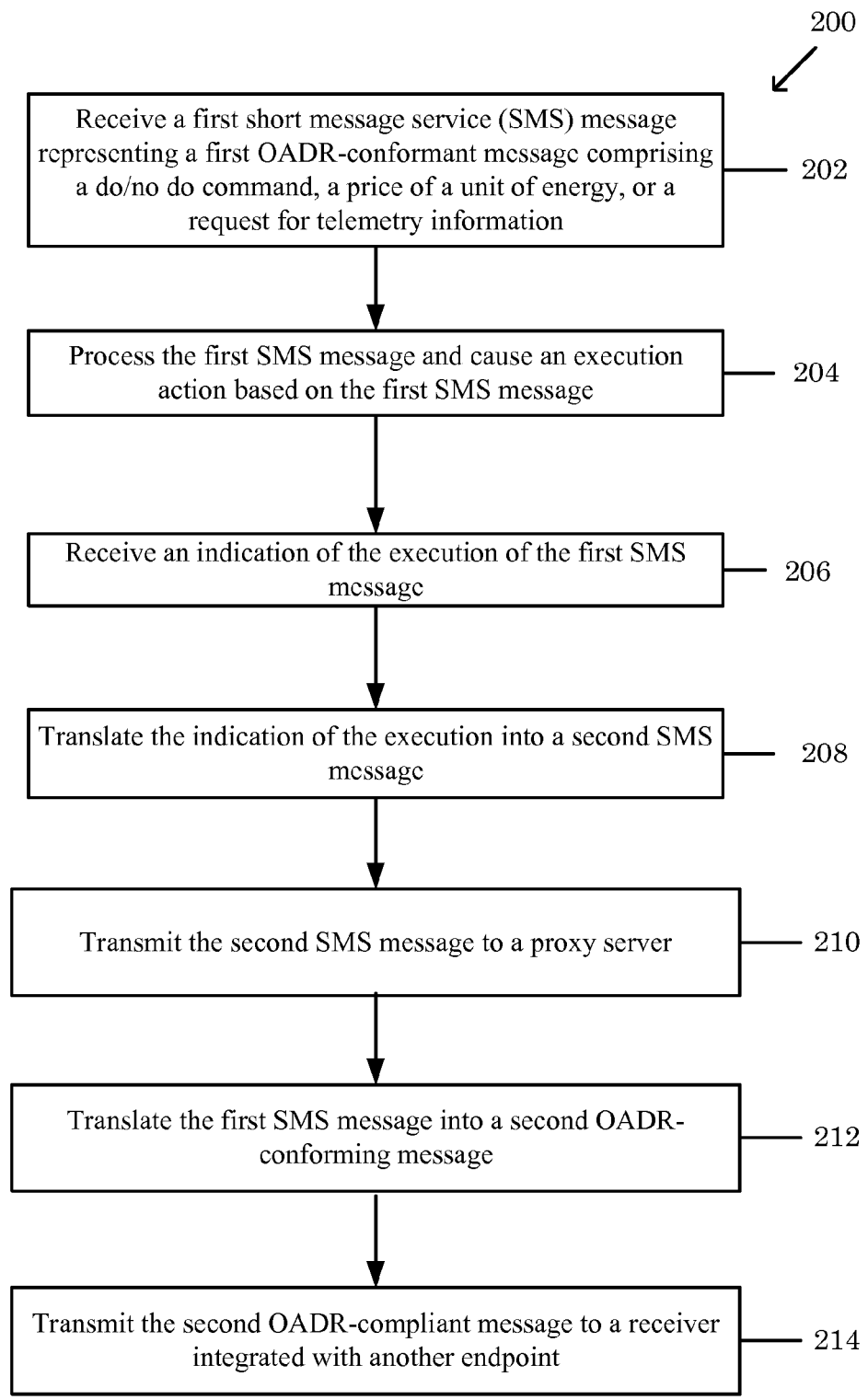
FIG. 2 is a flow diagram of a method for SMS-enabled OpenADR server and related communications in accordance with embodiments of the present invention.

FIG. 2 illustrates a method 200 performed by an endpoint for SMS-enabled communications of OADR-conformant message to and from a CDC. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by endpoint 102 of FIG. 1.

Method 200 begins at block 202, where the endpoint receives a first SMS message from the CDC via the SMS gateway and network. The first SMS message may include, but is not limited to, a communication from an OADR-conformant node, and may be related to one or more of the following elements: 1) a do/no do command; 2) a price of a unit of energy; or 3) a request for telemetry information. One skilled in the art will appreciate that other elements than those listed above may also be the subject of SMS messages in embodiments of the invention.

At block 204 the endpoint 102 processes the first SMS message and causes an execution action based on the first SMS message. An example of an execution action may be a change in a thermostat setting to reduce the energy usage by the energy consuming system. Another example of an execution action is to obtain a meter reading of energy usage by the energy consuming system.

At block 206, the endpoint receives a response to the execution action from the energy consuming system via the digital inputs or analog inputs of the endpoint. Subsequently, at block 208 the endpoint translates the response into a second SMS message and may direct the second SMS message to an outgoing message queue 106 of the endpoint. In one embodiment, a message processor at the endpoint receives data from the response and translates the response by placing it in SMS-compliant format using a pre-determined SMS message format protocol, such as the example format discussed above, agreed to between the endpoint and CDC. In an embodiment, the CDC may be a proxy server which acts an intermediary for requests from an OADR-conformant node.

Then, at block 210 the second SMS message is transmitted from an outgoing message queue of the endpoint to the CDC or proxy server.

At block 212 the endpoint translates the first SMS message into a second OADR-conforming message. Lastly, at block 214, the endpoint transmits the second OADR-conforming message to a receiver integrated with another endpoint. In an embodiment, the endpoint may direct the second OADR-conforming message to the outgoing message queue 106 to be transmitted at a certain time in the future.

In another embodiment, the second OADR-conforming message may be transmitted via Internet Protocol. One skilled in the art will appreciate that the particular order in which the second SMS message and the second OADR-conforming message are sent may vary in implementations of embodiments of the invention. For example, the second SMS message may be sent prior to the second OADR-conforming message and vice versa. One skilled in the art will further appreciate that the second SMS message and the OADR-conforming message may be related to each other in some embodiments, and, in other embodiments, may refer to discrete events that are unrelated to one another.

Figure 3:
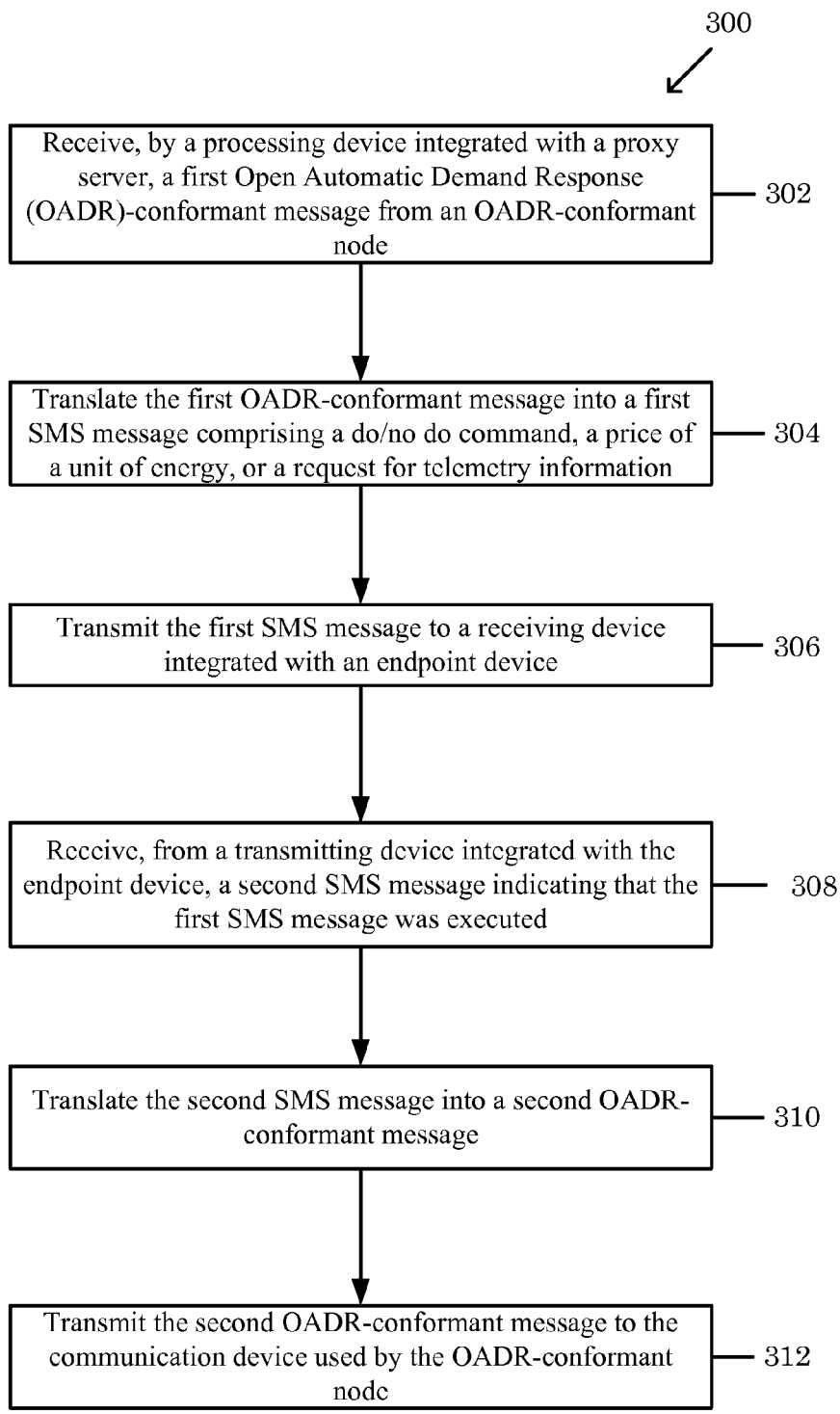
FIG. 3 is a flow diagram of another method for SMS-enabled OpenADR server and related communications in accordance with embodiments of the present invention.

FIG. 3 illustrates a method 300 performed by a CDC processing OADR-conformant messages for communications with a two-way SMS-enabled endpoint. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by CDC 120 of FIG. 1.

Method 300 begins at block 302, where the CDC receives an OADR-conformant message from an OADR-conformant node via a secure connection. As discussed above, the OADR-conformant message may be related to one or more of the following topics: 1) a do/no do command; 2) a price of a unit of energy; or 3) a request for telemetry information. In one embodiment, the question is sent from a computer system or an OADR-conformant node operated by an energy provider.

In an embodiment, the CDC may receive, from the OADR-conformant node, information that pertains to a class of endpoints. A class of endpoints may be a group of endpoints in which the energy consuming systems of such endpoints are similarly situated. For example, if the energy provider aims to send a certain message to a predefined group of energy consuming systems, then those endpoints that are associated with these energy consuming systems are collectively considered to be a class. In an embodiment, the OADR-conformant node may define a group of energy consuming systems that are similarly situated and assign these energy consuming systems to a class. The information related to the class of energy consuming systems may be transmitted to the CDC. The CDC may associate the class of energy consuming systems with their respective endpoints, thereby defining the class of energy consuming systems.

At block 304, the CDC translates the OADR-conformant message into a first SMS message by placing the OADR-conformant message in SMS-compliant format using an SMS message format protocol as discussed above and agreed to between the endpoint and CDC. Then, at block 306, the CDC transmits the first SMS message to a receiving device integrated in the endpoint. In one embodiment, the first SMS message may be transmitted via an SMS gateway and/or a network.

In block 308, the CDC receives from the endpoint a second SMS message comprising a response to the first SMS message. In one embodiment, the second SMS message is received via the SMS gateway and the network. In block 310, the CDC translates the second SMS message into a second OADR-conformant message, which is a format that is compliant with the secure connection and the front end web service of the OADR-conformant node by placing the SMS messages in a format using a secure connection format protocol as agreed to between the CDC and the OADR-conformant message. Finally, in block 312, the CDC transmits the second OADR-conformant message to the OADR-conformant node via the secure connection.

Figure 4:
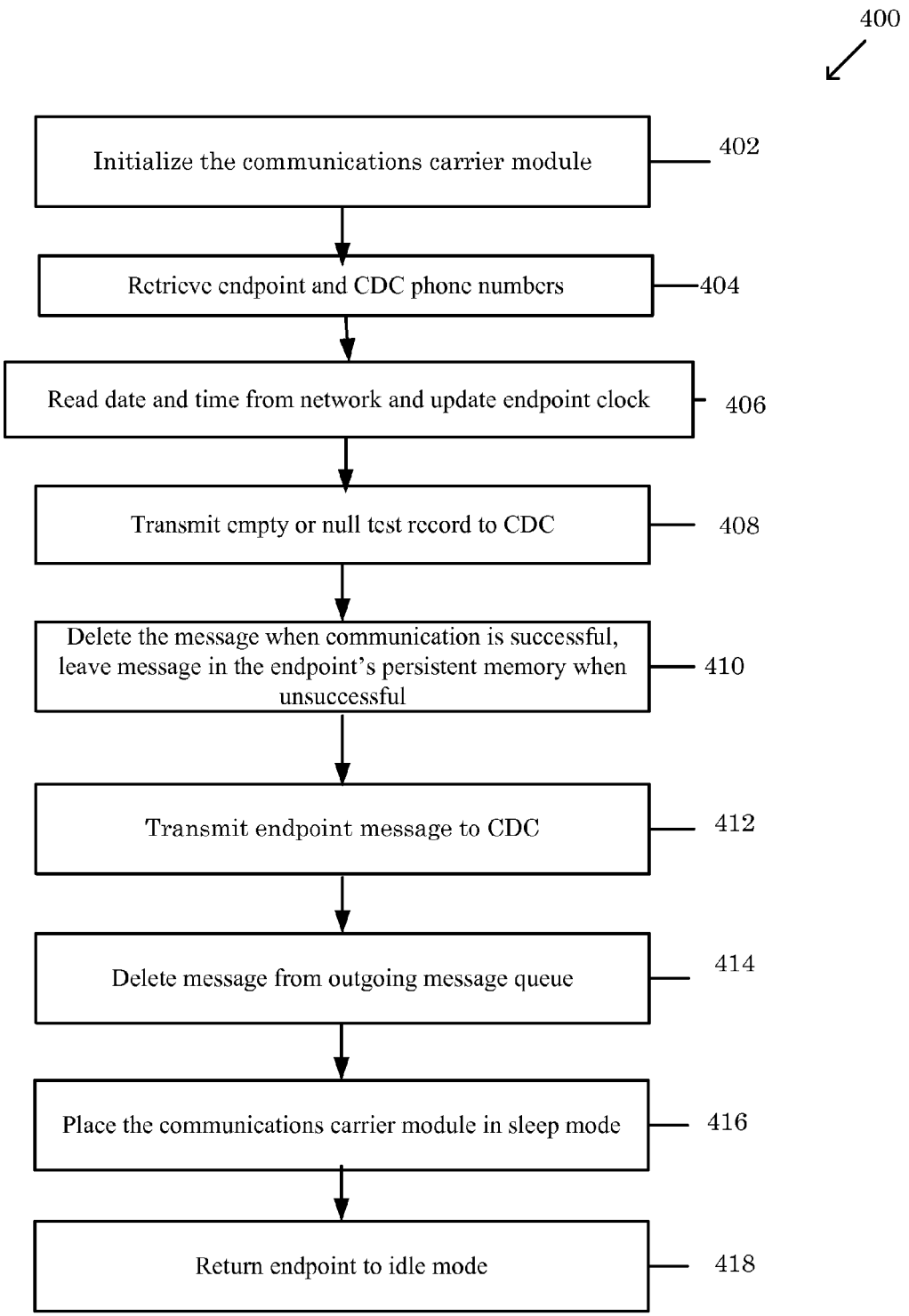
FIG. 4 is a flow diagram of a method for provisioning SMS-enabled server and related communications in accordance with embodiments of the present invention.

FIG. 4 illustrates a method 400 for transmitting an SMS message from the endpoint to the CDC. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by endpoint 102 of FIG. 1.

Method 400 begins at block 402, where the endpoint, which is in an idle mode, initializes its respective communications carrier module to notify the carrier that the endpoint is prepared to communicate with the CDC. At block 404, the endpoint retrieves phone numbers that are associated with the endpoint and with the CDC. At block 406, the endpoint reads the date and the time from the network and updates the endpoint clock.

At block 408, the endpoint transmits an empty record or a null test record to the CDC to establish a communications link between the endpoint and the CDC. At block 410, the endpoint deletes the empty or null test message when the communication is successful, but leaves the empty or null test message in the endpoint's memory when the communication is unsuccessful.

Then, at block 412, the endpoint transmits an SMS message to the CDC. In one embodiment, the communication carrier provides SMS communication capabilities for the endpoint. Subsequently, at block 414, the endpoint deletes the SMS message from the outgoing message queue. At block 416, the endpoint places the communications carrier module in sleep mode. Lastly, at block 418, the endpoint returns to the idle mode.

Figure 5:
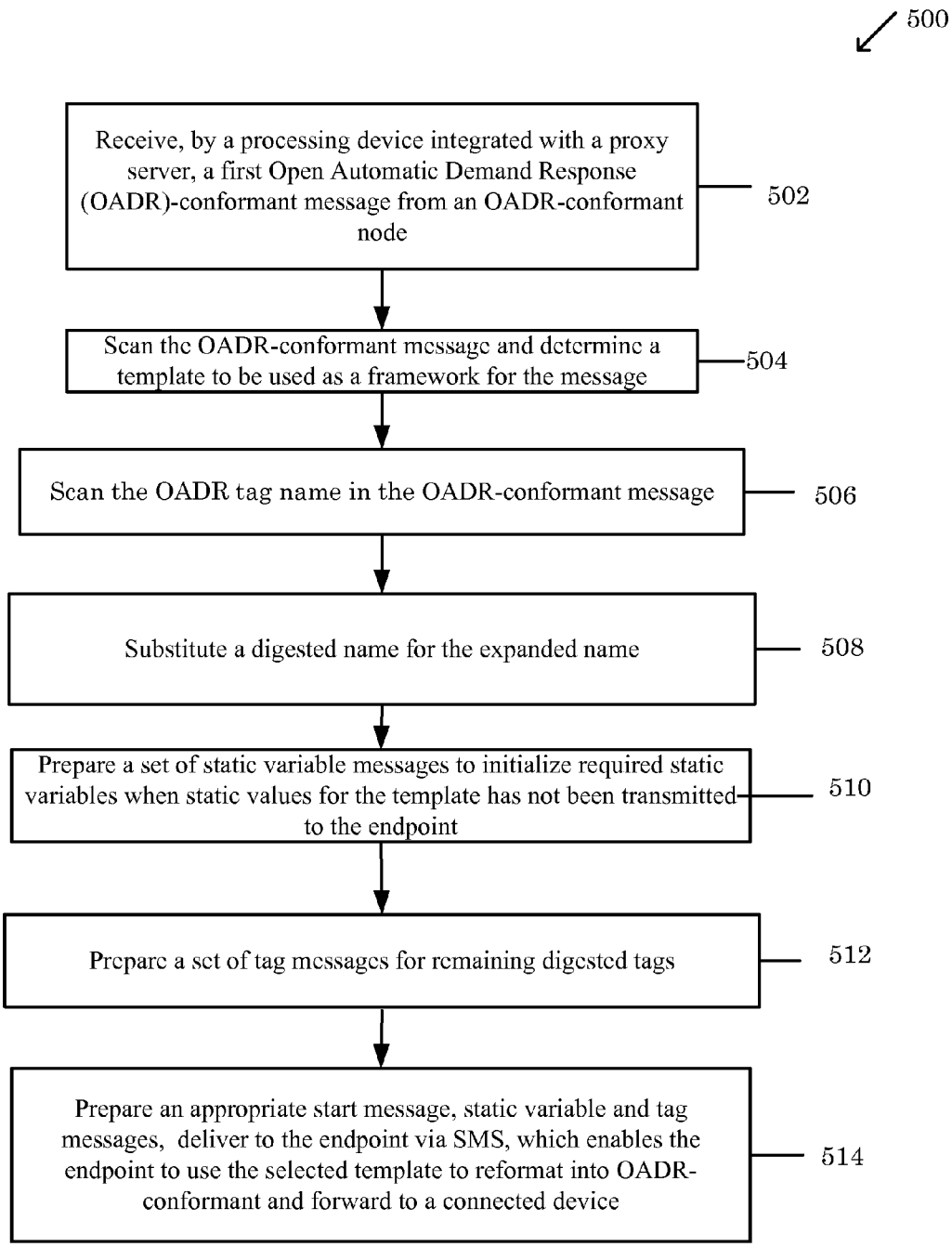
FIG. 5 is a flow diagram of a method for SMS-enabled OpenADR server and related communications in accordance with embodiments of the present invention.

FIG. 5 illustrates an OADR-conformant message digesting method 500 performed by a CDC. In one embodiment, the digesting method 500 may process a block of data and return a bit string of a predetermined size. The method 500 enables an endpoint to use a selected template to reformat an SMS message into an OADR-conformant message that can be communicated to another endpoint or device. The OADR-conformant message digesting method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by the CDC 120 of FIG. 1.

Method 500 begins at block 502, where a CDC or a proxy server receives a first Open Automatic Demand Response (OADR)-conformant message from an OADR-conformant node. At block 504, the CDC scans the OADR-conformant message and determines a template to be used as a framework for the message. In one embodiment, the template may be used to create a framework for the elements of an SMS message.

Then at block 506, the CDC scans the OADR tag name in the OADR-conformant message. An OADR tag may signify the opening and closing of an OADR message. At block 508, the CDC substitutes a digested name for the expanded OADR tag name. In an embodiment, the OADR-conformant message may be an update message to a pre-existing OADR-conformant message, for example, to alter the value of an element. When the OADR-conformant message is an update message, only the fields with altered values are digested.

Subsequently, at block 510, the CDC prepares a set of static variable messages to initialize the required static variables when static values for the template have not been transmitted to the endpoint. A static variable may be used to set values for an OADR-conforming message or tag that remains fixed or constant. The endpoint may store all static values associated with each template. At block 512 the CDC prepares a set of tag messages for the remaining digested tags. Lastly, at block 514, the CDC prepares an appropriate start message, static variable, and tag messages, and transmits them to the endpoint.

Figure 6:
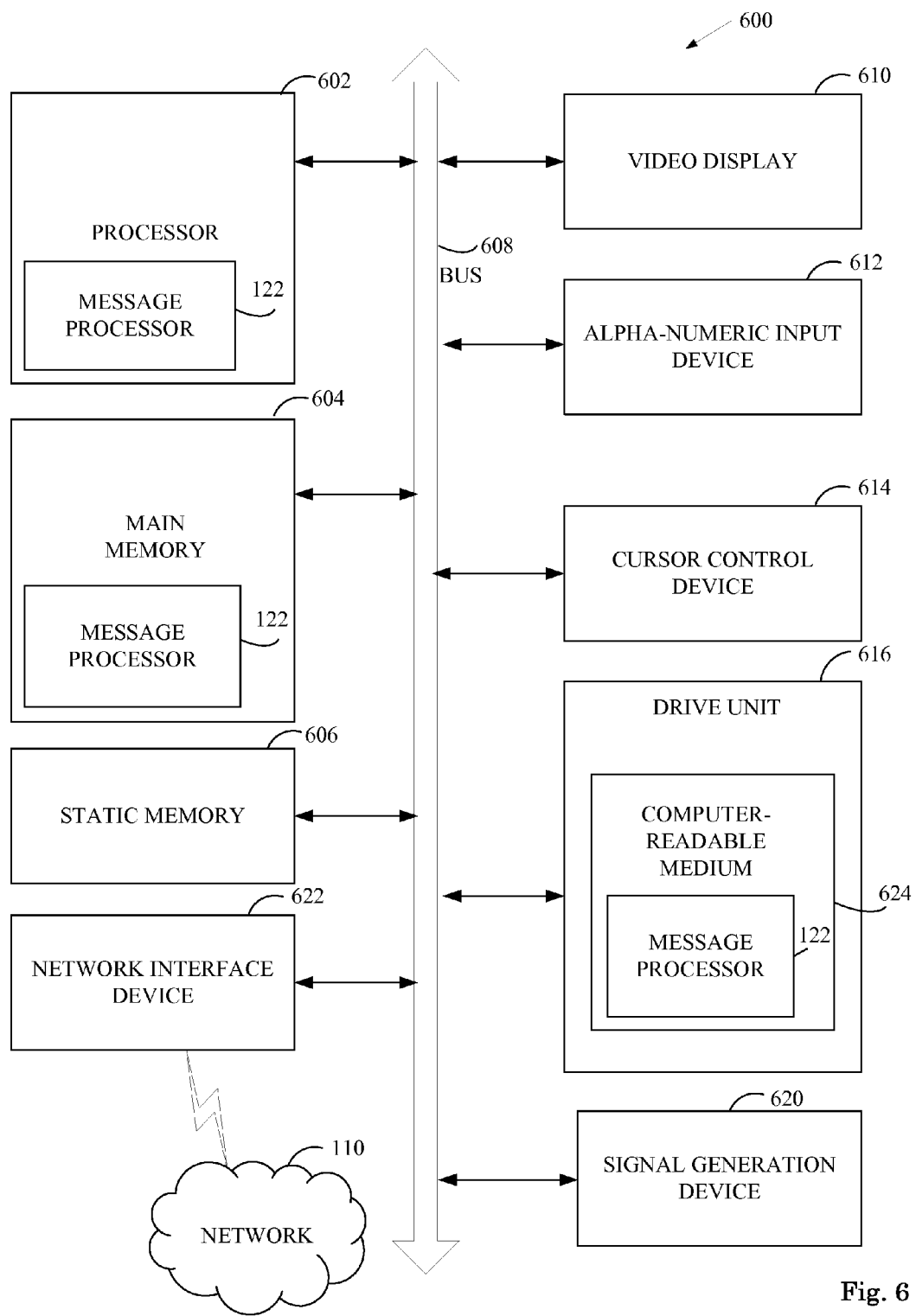
FIG. 6 is a block diagram of a computer system that may perform one or more of the operations described herein.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions for performing the operations and steps discussed herein, illustrated in FIG. 6 by depicting instructions for message processor 122 within processor 602.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions (e.g., message processor 122) embodying any one or more of the methodologies or functions described herein. The message processor 122 may also reside, completely or at least partially, within the main memory 604 and/or within the processor 602 during execution thereof by the computer system 600, the main memory 604 and the processor 602 also constituting computer-readable storage media. The instructions for message processor 122 may further be transmitted or received over a network 110 via the network interface device 622.

While the computer-readable storage medium 624 is shown in an embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "transmitting", "receiving", "translating", "processing", "determining", and "executing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device integrated with a first endpoint device, a first short message service (SMS) message that contains information in an Open Automatic Demand Response (OADR)-conformant format;
   processing, by the processing device, the first SMS message to identify an OADR tag within the first SMS message and extract an OADR element associated with the OADR tag from the first SMS message, the OADR element comprising a value associated with energy consumption pricing, energy consumption curtailment, or grid reliability;
   reformatting, by the processing device, the first SMS message into a first OADR-conformant message having the OADR element inserted into the first OADR-conformant message in a format that is compliant with a secure connection format protocol utilized by an energy consuming device; and
   causing the energy consuming device to execute an action based on the information contained in the first SMS message by transmitting the first OADR-conformant message to the energy consuming device.

2. The method of claim 1, further comprising
   receiving, from the energy consuming device, a response indicative of an execution of the action;
   generating a second SMS message based on the response; and
   transmitting the second SMS message to a proxy server indicating the execution of the action.

3. The method of claim 2, wherein the second SMS message comprises information about a meter reading, a date of the meter reading, and a time of the meter reading.

4. The method of claim 1, wherein the first SMS message comprises one of a do command, do not command, a price of a unit of energy, or a request for telemetry information.

5. The method of claim 4, further comprising:
   receiving a dictionary update message;
   updating a dictionary based on the dictionary update message;
   receiving one of a start message, a static variable and a tag message, indicating an OADR format;
   reformatting the first SMS message into the first OADR-conformant message based on the updated dictionary; and
   transmitting the first OADR-conformant message to a receiver integrated with a second endpoint device.

6. The method of claim 5, wherein the first OADR-conformant message is transmitted to the receiver integrated with the second endpoint device via Internet Protocol (IP).

7. A system comprising:
   a memory;
   a processing device communicably coupled to the memory, the processing device configured to:
   receive a first SMS message that contains information in an OADR-conformant format;
   process the first SMS message to identify an OADR tag within the first SMS message and extract an OADR element associated with the OADR tag from the first SMS message, the OADR element comprising a value associated with energy consumption pricing, energy consumption curtailment, or grid reliability;
   reformat the first SMS message into a first OADR-conformant message having the OADR element inserted into the first OADR-conformant message in a format that is compliant with a secure connection format protocol utilized by an energy consuming device; and
   cause the energy consuming device to execute an action based on the information contained in the first SMS message by transmitting the first OADR-conformant message to the energy consuming device.

8. The system of claim 7, wherein the processing device is further to:
   receive, from the energy consuming device, a response indicative of an execution of the action;
   generate a second SMS message based on the response; and
   transmit the second SMS message to a proxy server indicating the execution of of the action.

9. The system of claim 8, wherein the second SMS message comprises information about a meter reading, a date of the meter reading, and a time of the meter reading.

10. The system of claim 7, wherein the first SMS message comprises one of a do command, do not command, a price of a unit of energy, or a request for telemetry information.

11. The system of claim 10, wherein the processing device is further to:
    receive a dictionary update message;
    update a dictionary based on the dictionary update message;
    receive one of a start message, a static variable, and a tag message, indicating an OADR format;
    reformatting the first SMS message into the first OADR-conformant message based on the updated dictionary; and
    transmit the OADR-conformant message to a receiver integrated with a second endpoint device.

12. The system of claim 11, wherein the first OADR-conformant message is transmitted to the receiver integrated with the second endpoint device via Internet Protocol (IP).

13. A method comprising:
    receiving, by a processing device, a first OADR-conformant message that contains information in an OADR-conformant format;
    identifying, by the processing device, an OADR tag within the first OADR-conformant message;
    extracting, by the processing device, an OADR element associated with the OADR tag from the first OADR-conformant message, the OADR element comprising a value associated with energy consumption pricing, energy consumption curtailment, or grid reliability;
    generating, by the processing device, a first SMS message that contains information in an OADR-conformant format, wherein the information in the OADR-conformant format is generated by having the OADR element inserted into a body of the first SMS message; and
    transmitting, by the processing device, the first SMS message to a receiving device integrated with an endpoint device that is communicably coupled to an energy consuming device so as to cause the energy consuming device to execute an action based on the information contained in the first SMS message.

14. The method of claim 13, further comprising:
transmitting, to the receiving device integrated with the endpoint device, one of a start message, a static variable and a tag message, indicating an OADR format; and
receiving, from a transmitting device integrated with the endpoint device, a second SMS message indicating an execution of the action by the energy consuming device based on the first SMS message.

15. The method of claim 14, wherein the second SMS message comprises information about a meter reading, a date of the meter reading, and a time of the meter reading.

16. The method of claim 13, wherein the elements of the first SMS message comprise at least one of a do command, do not command, a price of a unit of energy, or a request for telemetry information.

17. The method of claim 13, further comprising:
receiving, from a transmitting device integrated with the endpoint device, a polling message indicating a read only memory (ROM) version;
generating a dictionary update message based on the ROM version; and
transmitting the dictionary update message to the endpoint device, wherein receiving, by the processing device, the first OADR-conformant message is from an OADR-conformant node.

18. The method of claim 14, further comprising:
reformatting the second SMS message into a second OADR-conformant message; and
transmitting the second OADR-conformant message to the OADR-conformant node.

19. A non-transitory computer readable storage medium comprising data that, when executed by a processing device, causes the processing device to perform a method comprising:
receiving a first OADR-conformant message that contains information in an OADR-conformant format;
identifying, by the processing device, an OADR tag within the first OADR-conformant message;
extracting, by the processing device, an OADR element associated with the OADR tag from the first OADR-conformant message, the OADR element comprising a value associated with energy consumption pricing, energy consumption curtailment, or grid reliability;
generating a first SMS message that contains information in an OADR-conformant format, wherein the information in the OADR-conformant format is generated by having the OADR element inserted into a body of the first SMS message; and
transmitting the first SMS message to a receiving device integrated with an endpoint device that is communicably coupled to an energy consuming device so as to cause the energy consuming device to execute an action based on the information contained in the first SMS message.

20. The non-transitory computer readable storage medium of claim 19, wherein the method further comprises:
transmitting, to the receiving device integrated with the endpoint device, one of a start message, a static variable and a tag message, indicating an OADR format; and
receiving, from a transmitting, by a transmitting device integrated with the endpoint device, a second SMS message indicating an execution of the action by the energy consuming device based on the first SMS message.

21. The non-transitory computer readable storage medium of claim 20, wherein the second SMS message comprises information about a meter reading, a date of the meter reading, and a time of the meter reading.

22. The non-transitory computer readable storage medium of claim 19, wherein the first SMS message comprises one of a do command, do not command, a price of a unit of energy, or a request for telemetry information.

23. The non-transitory computer readable storage medium of claim 19, wherein the method further comprises:
receiving, from a transmitting device integrated with the endpoint device, a polling message indicating a read only memory (ROM) version;
generating a dictionary update message based on the ROM version; and
transmitting the dictionary update message to the endpoint device, wherein receiving, by the processing device, the first OADR-conformant message is from an OADR-conformant node.

24. The non-transitory computer readable storage medium of claim 20, wherein the method further comprises:
reformatting the second SMS message into a second OADR-conformant message; and
transmitting the second OADR-conformant message to the OADR-conformant node.

* * * * *